Patented June 11, 1935

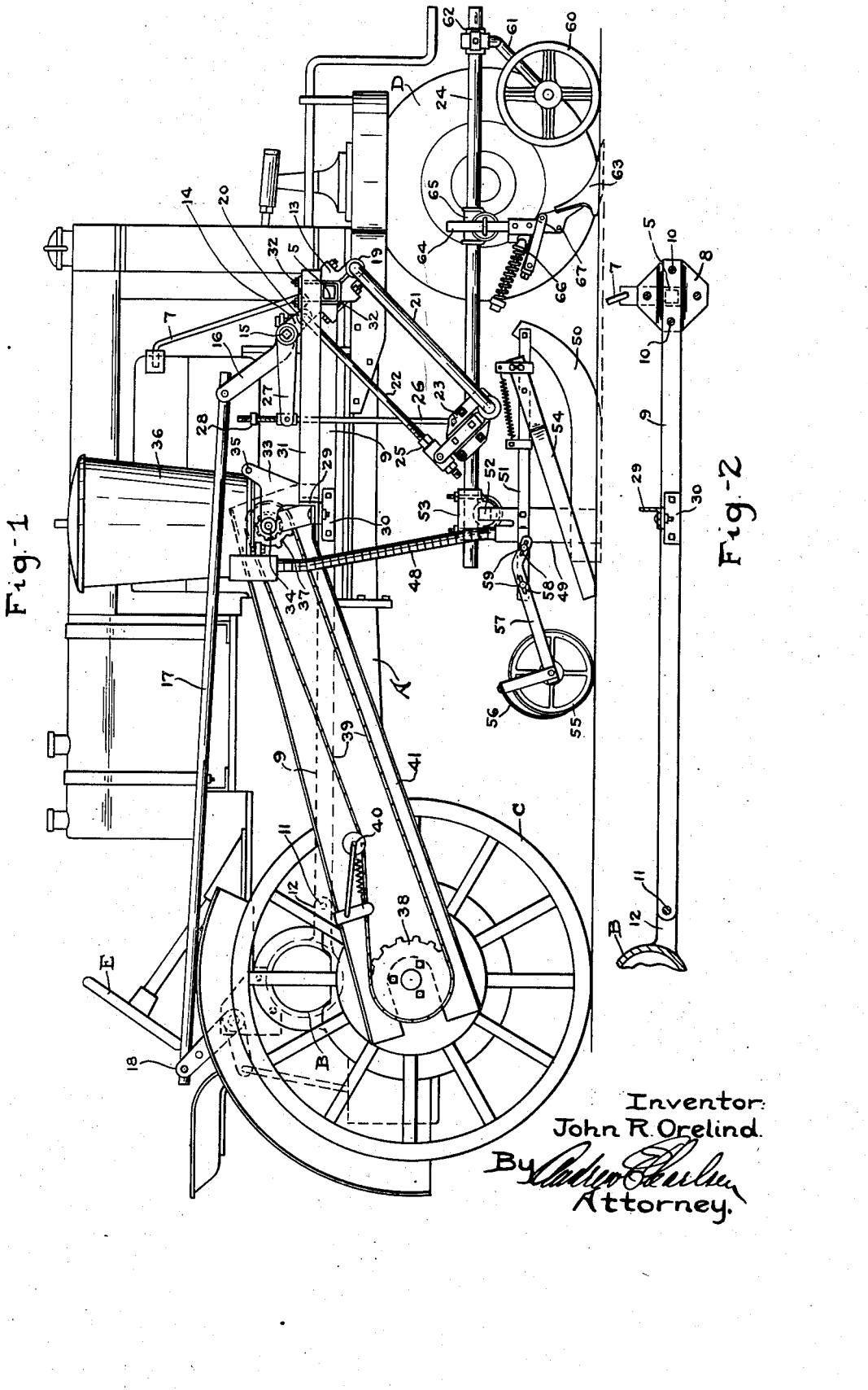

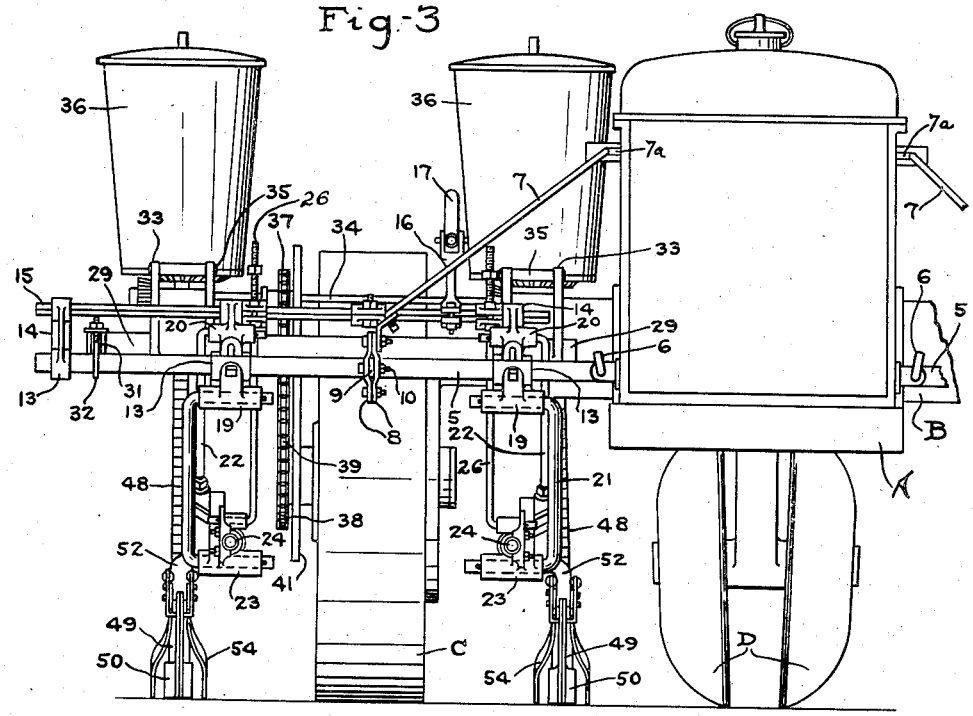
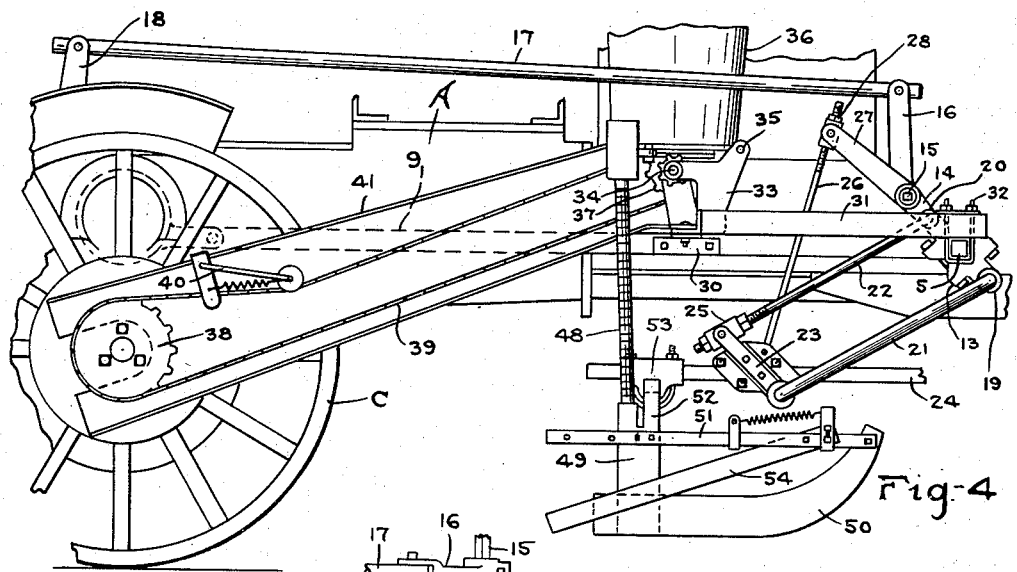

2,004,416

UNITED STATES PATENT OFFICE 2,004,416

PLANTER ATTACHMENT FOR TRACTORS

John R. Orelind, Moline, Ill., assignor to Minneapolis-Moline Power Implement Company, Hopkins, Minn., a corporation of Delaware Application June 23, 1934, Serial No. 732,107

5 Claims. (Cl. 111—59)

This invention relates to seed planting apparatus for tractors of the type designed particularly for row crop work, and the primary object is to provide a practical, efficient, and comparatively simple planter mechanism, attached to and extending laterally from the foreward end of the tractor so as to be within visual observation and manual control of the tractor operator, and where it will respond most quickly to adjustments of the steering unit; such planter mechanism preferably being designed as a removable attachment, but which may also be considered as a part of the traction machine. More especially the object is to provide a tractor planter wherein each planter unit will be propelled by a draft connection with the tractor, which connection will also operate to eliminate side sway while maintaining proper level or parallelism of the planter runners with respect to the ground surface. A further purpose is to mount the seed receptacle independently of the draft and runner devices and to then connect the receptacle with the planter shoe or runners by a flexible telescopic spout so that the varying weight of the seed receptacle will not interfere with the floating action necessary in the planter shoe as it traverses uneven soil, or with the vertical adjustments that are from time to time made through manually operated controls. Still other and more specific objects will be disclosed in the course of the following specification, of which the accompanying drawings constitute a part, and wherein:—

Fig. 1 is a right side elevation of a tractor equipped with my improved planter mechanism.

Fig. 2 is a detail elevation of a draft bar, one of which is employed at each side of the tractor and connects the transverse front draft beam to the rear of the tractor.

Fig. 3 is a front elevation of the tractor showing two transversely spaced planter units carried at one side thereof, it being understood that similar units (not shown) are arranged in like manner at the opposite or left side of the tractor in practice.

Fig. 4 is a side elevation similar to Fig. 1, but with the planter in raised or inoperative position, and with various parts omitted or broken away for purpose of illustration.

Fig. 5 is a detail plan view showing the device for releasing the feed shaft when the planter mechanism is lifted out of engagement with the ground.

Referring to the drawings more particularly and by reference characters, and with like characters designating corresponding parts in the several views, A designates the tractor main frame having axle housings B at its rear. Traction wheels C support the rear end of the tractor, and the housings B are preferably offset upwardly from the wheel centers to provide higher crop clearance when the tractor is used for working in grown row crop fields. The front end of the tractor is supported by a steering truck D, operated by hand wheel E, and this truck is sufficiently narrow so that it may travel clear of and between the crop rows.

Extending laterally from each side of the front end of the tractor is a draft beam 5. Each of such beams is preferably attached to the tractor by a removable coupling pin 6, so as to be readily detachable, and is normally supported in horizontal position by an inclined brace rod 7. The draft beam is preferably formed of square steel tubing, and, as shown, is made in two sections rigidly connected by bolts passing through end plates 8 formed integrally with the adjoining section ends. If only two planting units are to be employed, i. e., only one at each side of the tractor, then the outer draft beam sections and the planter units carried thereby may be removed. Ordinarily, however, when planting crops such as cotton and corn it is desirable to employ four planter units, two at each side of the tractor, and in rows between which the tractor wheels will travel.

As shown in Figs. 2 and 3, the connected draft beam end plates 8 form a recess in which the front end of a longitudinally extending draft bar 9 is secured by bolts 10. The rear end of this bar is releasably secured by a pin 11 to a lug 12 of the housing B, as shown in Figs. 1 and 2. It will thus be seen that each draft beam is rigidly braced and secured at all times in its transverse, horizontal, operative position.

Bracket castings 13 are rigidly clamped upon the draft beam 5, but when loosened are longitudinally adjustable on the beam so that those which support or connect with planter units may be moved transversely of the machine to regulate the spacing between the crop rows to be planted. These brackets have upwardly and rearwardly extending bearing portions 14 in which are journaled a control shaft 15 which is disposed parallel with the draft beam and is preferably square in cross section, as shown. The shaft 15 has an operating arm 16 connected by a rod 17 to a manually operative control device 18, within reach of the tractor operator, and which device, when actuated, will operate to oscillate the shaft 15 in the bearing arms 14. The device 18 may be of any suitable design, and either hand or foot operated, and I have here merely indicated a foot operated type now in use.

The brackets 13 are further provided with bearing lugs 19 and 20 in which the upper, forward ends of bars 21 and 22, respectively, have bearing or pivotal engagement. The bars 21 and 22 of each unit maintain substantial parallelism with each other at all times, are of substantially the same effective lengths, and are pivoted at their lower rear ends to a casting 23 in which is adjustably secured a horizontal, longitudinally disposed support bar 24. The rod 22 may have provision for length adjustment as shown at 25 in Figs. 1 and 4, to take up slack from wear, or to occasionally secure better operating position for the planting devices.

The support bar 24, together with the various ground engaging devices secured thereon, are raised from and lowered into operative position by a link rod 26, the lower end of which is pivoted to the casting 23, while its other end pivotally and slidably engages a crank arm 27, extending rigidly rearwardly from the control shaft 15, such sliding movement of the link rod being limited, downwardly, by a stop nut 28. When the arm 27 is lifted, through oscillation of the shaft 15 by control rod 17, it will engage the nut 28 to lift rod 26 and planter devices from the ground, and the parallelism maintained by the bars 21—22 will keep the support bar 24 horizontal so that the earth engaging devices will be properly lifted and lowered. It will also be noted that the bars 21—22 will also maintain proper relative positions as between the devices when they are in working positions, and also that the sliding action of the rod 26 with respect to the crank arm 27 permits a free floating action of the runner frame when in engagement with the ground. The floating action or movement, however, is in a vertical, longitudinal plane only, it being understood that the right angular end extensions of the bar 21, being transversely journaled in the brackets 13 and 23, prevents any possibility of side sway or lateral weaving of the planter runners as they travel over the field.

Attention is now directed to further frame structure including, at each side of the tractor, an L-shaped bar having a relative long leg 29 that is disposed transversely, rests upon the draft bar 9, and is rigidly secured thereto by bracket 30; and a shorter leg 31, which extends longitudinally forward, and is bifurcated to receive a U-bolt 32 which engages under and about the draft beam to form a rigid connection between the latter and the bar arm 31.

This angular frame member 29—31 is provided with upstanding brackets 33 in which is journaled the seed feed shaft 34, and to which are pivotally mounted, as at 35, the seed receptacles or hoppers 36, which hoppers are thus mounted so that they may conveniently be tilted forward for cleaning or emptying purposes. Rotation of the shaft 34 operates the seed discharging mechanisms under the hoppers, but such mechanisms are not here detailed inasmuch as they form no part of the present invention and may be of any conventional design.

It should be noted, however, that the shaft 34 is actuated directly from the tractor wheel, so that the feed will be synchronized with the speed of the tractor, this driving mechanism including a sprocket gear 37 on the shaft 34, a sprocket gear 38 on the traction wheel hub, and a sprocket chain 39 connecting said gears. In association with these driving elements it is preferable to employ a chain tightener 40 and a guard plate 41.

Referring now to Fig. 5 it will be seen that the seed feed shaft rotation is further controlled by the position of the planter runners with respect to the ground, as effected by manual manipulation of the control shaft 15 through the control rod 17; thus preventing the seed from being discharged except when the runners are in planting engagement with the field. To this end the sprocket gear 37 is rotatable on the shaft 34 but its hub has a toothed clutch member 42 adapted to engage a toothed clutch collar 43 slidably keyed on the shaft, and this engagement is yieldably maintained by a spring 44 so that the gear will drive the shaft. When the shaft 15 is manually actuated, however, to lift the planter unit out of engagement with the ground, as previously described, it exerts a forward pull on a rod or cable 45, which in turn operates through a bell-crank lever 46, and against the spring 44, to open the clutch. The bell-crank 46 is conveniently trunnioned on a bracket 47 secured to the frame bar 29.

From the foregoing it will be seen that seed may be discharged only when the planter is in operation in the ground, and that the rapidity of the seed feed will at all times be governed by the ground speed of the machine, thus insuring economical and uniform distribution of the seed through the furrows.

As the seeds are intermittently discharged from the hopper 36 they drop through a flexible conduit or spout 48, to the outlet box 49 of the planter shoe which includes the usual runners 50. The spout 48 is formed of flexible ribbon steel, spirally wound, and with the successive coils telescoped, so that as the runners 50 fluctuate vertically when they traverse the ground, or when the planter unit is manually or otherwise elevated, the tube 48 will automatically lengthen and shorten without kinking, bowing, or offering any noticeable resistance.

The runner unit includes longitudinal brace bars 51, and has a shank 52 releasably secured in a casting bracket 53 that is adjustable on the support bar 24, so that the unit may be adjusted longitudinally with respect to the machine. The shank 52 may be of the vertical and vertically adjustable type such as illustrated at 64 for the unit 63. Cover blades 54, spring held to the ground, are pivoted to the brace bars 51, and operate to replace the furrowed earth and cover the planted seed.

In many instances it is desirable to compress the loosened earth that has been reverted to cover the seed, and to that end I provide presser wheels 55, as shown in Fig. 1, which wheels preferably have concave rim surfaces for engaging the loose ground, and self cleaning scraper blades 56 to clear such surfaces of adhering soil. The wheels are journaled in bearing arms 57, and, as shown, these arms are bent at their forward slots 58, engaged by screws or bolts 59 to clamp the arms to the brace bars 51. By loosening the bolts 59 and moving the arms 57 back and forth, the elevation of the wheels 55 with respect to the runners 50 may be regulated at will. It may here be noted that in the absence of other gauge wheels the press wheels 55 may be employed to regulate the planting depth.

When independent gauge wheels are employed they are preefrably attached to the forward end portions of the support bars 24, as shown in Fig. 1, and then include a ground wheel 60 journaled on a shank 61. The shank is adjustable vertically in a clamping bracket 62 which in turn is longitudinally adjustable on the support bar 24.

When a gauge wheel such as 60 is employed it is also frequently desirable to employ a so-called sweep between it and the planter runners 50, to loosen the soil behind the wheel and prepare it for the furrow forming shoe runners 50. This device includes a share plate 63 carried by a shank 64 vertically adjustable in a casting 65 movably secured on the bar 24. A spring trip device 66 operates to retain the share in operative position, but automatically releases it so that it can swing under and back, to prevent breakage, when unyielding obstructions are met with in the ground, the share being pivotally secured to the shank 64 as at 67.

The structural details and certain functional features of the invention now having been described, the general operation of the machine will no doubt be understood from the foregoing. However, a brief résumé may be made as follows:

When a field is to be planted with this machine, the planting units are first adjusted to the desired transverse spacing on the draft beam 5 so as to secure the required spacing or distance between the crop rows to be planted. The side hoppers 36 are filled with grain or seed, and the machine is then driven on to the field with the planter units in raised positions, as indicated in Fig. 4, at which time the clutch 42—43 is open so that the power driven clutch gear 37 can not rotate the feed shaft 34.

To start the planting operation it is only necessary for the operator to actuate the device 18 so as to pull the control rod 17 rearwardly, which action drops the planter runners 50 into engagement with the ground, and also closes the clutch 42—43 to start rotation of the feed shaft 34. The grain or seed is now intermittently discharged from the hoppers 36, and dropped down through the feed spouts 48 to the boots or boxes 49 so that the seed will fall into the furrows made by the runners 50. During the planting operation the stop nut 28 of the link rod 26 is out of engagement with the crank arm 27, and consequently the planter runners are free to fluctuate vertically, although they are maintained in rectilinear lines and are held against side sway by the parallel drag links 21 and 22, which links also of course maintain the support bar 24 in longitudinal, horizontal position at all times. The draft beam 5 is of course rigidly secured against rearward movement by the brace rod 9 and against downward movement by rod 7, and hence normally maintain relatively fixed positions with the tractor, yet are quickly releasable therefrom when the planter attachment is to be removed from the tractor. It may also be noted that the upper ends of rods 7 are movable in slots 7a to permit relative lateral raising of the planter structures when the tractor truck D travels through a valley or depression in the ground surface.

As the machine progresses over the field, the furrow formed by the runners 50 and into which the seeds are dropped is closed by the coverer blades 54, and if the presser wheels 55 are employed they will compress the earth which has thus been returned over the furrow. It may here again be noted that inasmuch as the hoppers 36 and the seed contained therein are carried on the upper frame structure, which is stationary with respect to the tractor, their weight will not be imposed upon the ground engaging units so as to fluctuate the downward pressure thereon, and also that the telescopic spout or ribbon tube 48 will allow of all required vertical fluctuations of the ground engaging structure with respect to the upper frame structure and hoppers without offering any noticeable resistance, at all times maintaining a proper feed arrangement as between the hoppers and planter runners.

As previously indicated, the presser wheels 55 may be employed for the purpose of regulating the depth of the runners 50 in the ground and thereby also regulating the planting depth. However, it is ordinarily preferable to employ a separate gauge wheel such as 60 in advance of each runner unit so as to travel upon the unplanted ground. And when a gauge wheel such as 60 is employed it is also occasionally desirable to employ the sweep blade 63 for the purpose of loosening the ground traversed by the gauge wheel, and better prepare such strip of ground for the planter runners 50.

It may here be noted that while the positions of the hoppers 36 may be transversely adjusted on the frame bar 29, in conjunction with the adjustments of the drag and runner frames on the draft beam 5, the latter adjustments may be made without corresponding adjustments of the hoppers and without interfering with the seed feeding devices inasmuch as the conduits 48 are sufficiently flexible to permit of relative lateral offsets as between the parts in question. In like manner the flexibility of the conduits 48 permits of the longitudinal adjustments of the runner frame brackets 53 on the support bars 24 without necessitating corresponding adjustments of the hoppers and seed releasing mechanisms.

It will be understood that the machine herein illustrated shows only a planter of the drill type, but that when planting corn or other crops which are to be cross cultivated, then a check row attachment of any preferred or conventional type may be employed so as to more accurately regulate the spacing between the planted seeds longitudinally in the furrow.

It will further be understood that while I have illustrated and described a preferred embodiment of the invention, it is obviously susceptible of various changes and modifications subject only to the spirit and scope of appended claims. What I claim to be new and desire to protect by Letters Patent is:

1. A planter attachment for a tractor comprising a frame for supporting planter units at the front end of the tractor so as to be in view of the tractor operator and steerable in conjunction with the front steering wheel unit of the tractor, said planter units each including a hopper stationary on the frame, a longitudinally disposed tool bar below the supporting frame, drag bars connecting the tool bar and supporting frame and permitting freedom for vertical movement of the tool bar, a runner frame slidably mounted on the tool bar and releasably secured thereto, thereby permitting adjustments of the runner frame longitudinally with respect to the direction of travel, and a seed conducting tube connecting the hopper and runner frame, said tube being flexible to allow for said runner frame adjustments.

2. A planter attachment for a tractor comprising a draft beam secured to and extending laterally from one side of the tractor, transversely spaced planting devices connected to the beam so as to be propelled thereby, said beam comprising longitudinal sections detachably connected at their ends, and with one planting device connected with each of said beam sections.

3. A planter attachment for a tractor comprising a draft beam secured to and extending laterally from one side of the tractor, transversely spaced planting devices connected to the beam so as to be propelled thereby, said beam comprising longitudinal sections detachably connected at their ends, and with one planting device connected with each of said beam sections, the adjacent ends of connected sections having flanges rigidly secured together by releasable connecting members.

4. A planter attachment for a tractor comprising a draft beam secured to and extending laterally from one side of the tractor, transversely spaced planting devices connected to the beam so as to be propelled thereby, said beam comprising longitudinal sections detachably connected at their ends, and with one planting device connected with each of said beam sections, the adjacent ends of connected sections having flanges rigidly secured together by releasable connecting members, and said flanges forming a recess to receive the forward end of a draft bar extending rearwardly for connection to a rear part of the tractor.

5. A planter attachment for a tractor comprising a draft beam secured to and extending laterally from one side of the tractor, a bracket carried on the beam, a pair of spaced, parallel drag bars extending rearwardly and downwardly from the bracket, a member connecting the rear ends of the drag bars, a tool beam secured to and longitudinally adjustable in said connecting member, and a planter device carried by said tool beam.

JOHN R. ORELIND.